US008327805B2

(12) United States Patent
Rogge et al.

(10) Patent No.: US 8,327,805 B2
(45) Date of Patent: Dec. 11, 2012

(54) ADJOINING EXTRUSIONS FOR ANIMAL HUSBANDRY TUNNEL DOOR PANELS

(75) Inventors: Timothy Joseph Rogge, Eau Claire, WI (US); Todd Charles Carlson, Eau Claire, WI (US); Frank R. Harris, Fayetteville, NC (US)

(73) Assignee: A.J. Manufacturing Inc., Bloomer, WI (US)

( * ) Notice: Subject to any disclaimer, the term of this patent is extended or adjusted under 35 U.S.C. 154(b) by 540 days.

(21) Appl. No.: 12/407,165

(22) Filed: Mar. 19, 2009

(65) Prior Publication Data

US 2010/0236491 A1 Sep. 23, 2010

(51) Int. Cl.
*A01K 31/18* (2006.01)
*A01K 1/00* (2006.01)

(52) U.S. Cl. ........................................ 119/493; 119/437

(58) Field of Classification Search .................. 119/437, 119/436, 444, 448, 482, 487, 493, 494; 52/204.66, 52/207, 204.1, 204.71; 403/364, 339
See application file for complete search history.

(56) References Cited

U.S. PATENT DOCUMENTS

| | | | | |
|---|---|---|---|---|
| 2,962,133 A * | 11/1960 | Kivett et al. | ...................... | 52/580 |
| 3,125,194 A * | 3/1964 | Kimmel et al. | ................... | 52/764 |
| 3,172,508 A * | 3/1965 | Doering et al. | ................. | 52/579 |
| 3,192,671 A * | 7/1965 | Smith | .............................. | 52/434 |
| 3,738,083 A * | 6/1973 | Shimano | ...................... | 52/584.1 |
| 3,758,997 A * | 9/1973 | Vance | .............................. | 52/97 |
| 4,129,970 A * | 12/1978 | Whitney | ....................... | 52/282.3 |
| 4,630,400 A * | 12/1986 | Hsieh | .............................. | 49/425 |
| 4,763,446 A * | 8/1988 | Kelly | .............................. | 49/407 |
| 4,944,118 A * | 7/1990 | Biro | ................................ | 49/504 |
| 4,967,531 A * | 11/1990 | Giles et al. | ................... | 52/587.1 |
| 5,557,899 A * | 9/1996 | Dube et al. | ...................... | 52/455 |

(Continued)

OTHER PUBLICATIONS

R.A. Bucklin, J.P. Jacob, F.B. Mather, J.D. Leary and I.A. Naas; Tunnel Ventilation of Broiler Houses; U.S. Department of Agriculture, Cooperative Extension Service, University of Florida, IFAS, Florida A. & M. University Cooperative Extension Program, and Boards of County Commissioners Cooperating; © 2008; 4 pgs.

(Continued)

*Primary Examiner* — Son T Nguyen
(74) *Attorney, Agent, or Firm* — Gerald E. Helget; Nelson R. Capes; Briggs and Morgan, P.A.

(57) ABSTRACT

An animal husbandry tunnel door with adjoining extrusions for closing a tunnel ventilation opening typically in a broiler house has opposing faces with top, bottom and side edges. The faces sandwich an insulation layer. The adjoining extrusions have a first door top, bottom and side extrusion, along with a second door side edge extrusion. The first door top, bottom and side edge extrusions each have parallel inner prongs with barbs and adjacent parallel outer flanges forming two slots therebetween for receiving the top, bottom and side edges of the opposing door faces as the inner prongs with barbs pass into the insulation and are held thereat. The second door side edge extrusion has parallel inner prongs adjacent parallel outer flanges forming two slots therebetween for receiving the other side face edges as the inner prongs with barbs pass into the insulation and are held thereat. The second extrusion has second opposing parallel skirt flanges with inward distal barbs adapted to impinge upon, securely capture and hold the outer flanges of one of the first extrusions of a second adjacent tunnel door.

3 Claims, 3 Drawing Sheets

U.S. PATENT DOCUMENTS

| | | | | |
|---|---|---|---|---|
| 5,603,585 | A | * | 2/1997 | Bruchu et al. ............... 403/382 |
| 5,675,947 | A | * | 10/1997 | Yane ............................. 52/207 |
| 5,839,234 | A | * | 11/1998 | Mayer ........................... 52/213 |
| 6,016,632 | A | * | 1/2000 | McGee et al. ................. 52/241 |
| 6,467,226 | B2 | * | 10/2002 | Dodson et al. ............... 52/220.1 |
| 6,606,833 | B2 | * | 8/2003 | Richardson et al. ......... 52/204.5 |
| 6,854,234 | B2 | * | 2/2005 | Gimpel et al. ............... 52/586.2 |
| 7,555,871 | B1 | * | 7/2009 | Neal ........................... 52/204.51 |
| 7,845,124 | B1 | * | 12/2010 | Neal ........................... 52/204.1 |
| 2004/0025454 | A1 | * | 2/2004 | Burgess ........................ 52/204.1 |
| 2007/0068097 | A1 | * | 3/2007 | Mierau et al. ................ 52/204.1 |
| 2009/0211184 | A1 | * | 8/2009 | Kerscher ...................... 52/204.1 |
| 2010/0011684 | A1 | * | 1/2010 | Neal ............................. 52/207 |

OTHER PUBLICATIONS

Dan Cunningham; Contract Broiler Production: Questions and Answers; University of Georgia—Poultry Science; Apr. 2004; 5 pgs.

Brian D. Fairchild; Basic Introduction to Broiler Housing Environmental Control; Cooperative Extension Service, The University of Georgia College of Agricultural and Environmental Sciences; Bulletin 1264, Mar. 2005; 4 pgs.

Jim Donald, J. Campbell and G. Simpson; Tunnel Inlet Doors—A Progress Report; The Poultry Engineering, Economics & Management Newsletter; Auburn University, in cooperation with the U.S. Poultry & Egg and Alabama Poultry & Egg Associations; No. 38, Nov. 2005; 4 pgs.

William A. Dozier III, M.P. Lacy and L.R. Vest; Broiler Production and Management; Cooperative Extension Service, The University of Georgia College of Agricultural and Environmental Sciences; Bulletin 1197; Aug. 2001; 7 pgs.

Reeves Supply Inc.; Installation Manual for Evaporative Cooler; Franklin, Georgia; at least by Feb. 2009; 19 pgs.

Hired Hand Manufacturing Inc.; PowerTrak Curtain/Vent Actuator Owners Manual; Bremen, Alabama; at least by Aug. 2007; 22 pgs.

Eagan Manufacturing, Inc.; VTH Series—Tunnel Ventilation Door; Sales Brochure; Black Rock, AR; Dec. 29, 2006; 2 pgs.

Cumberland; Tunnel Inlet Doors; Sales Brochure; Assumption, IL; Nov. 2007; 2 pgs.

Cumberland; Evaporative Cooling Systems; Internet advertising pages; http://www.cumberlandpoultry.com/english/komfortk.html; at least by Dec. 2008; 3 pgs.

Reeves Supply Co.; Setting the Standard for Evaporative Cooling; Internet advertising pages; http://reevessupply.com/index.html; at least by Dec. 2008; 2 pgs.

* cited by examiner

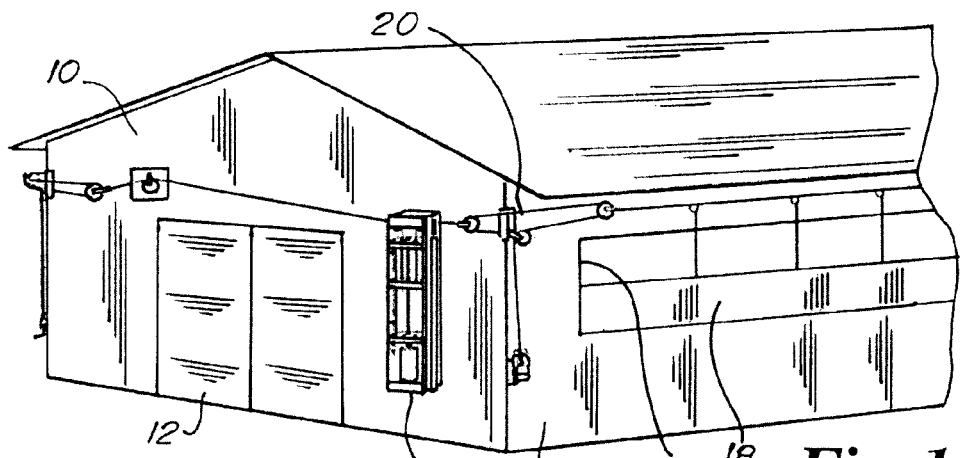
Fig. 1.
(PRIOR ART)
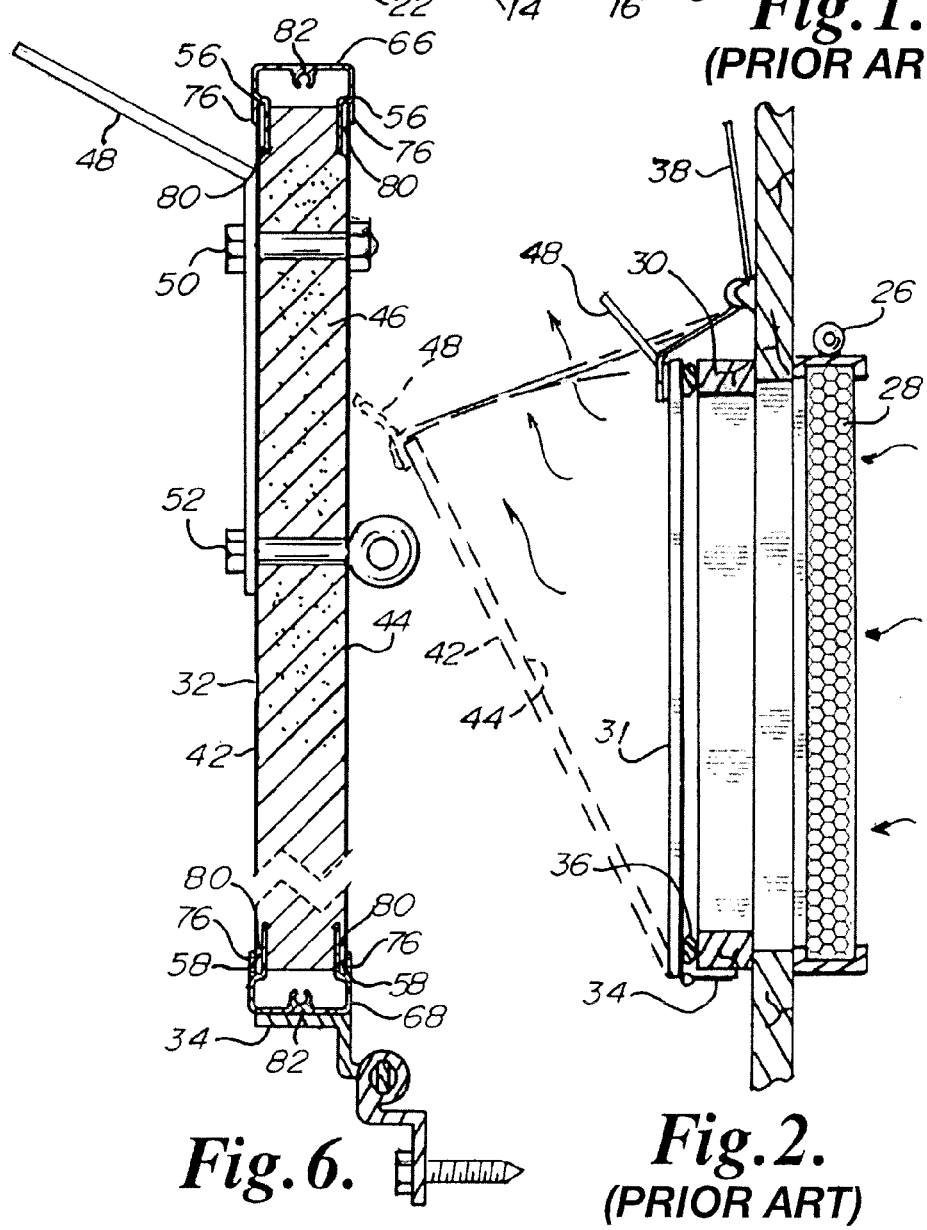
Fig. 6.            Fig. 2.
                      (PRIOR ART)

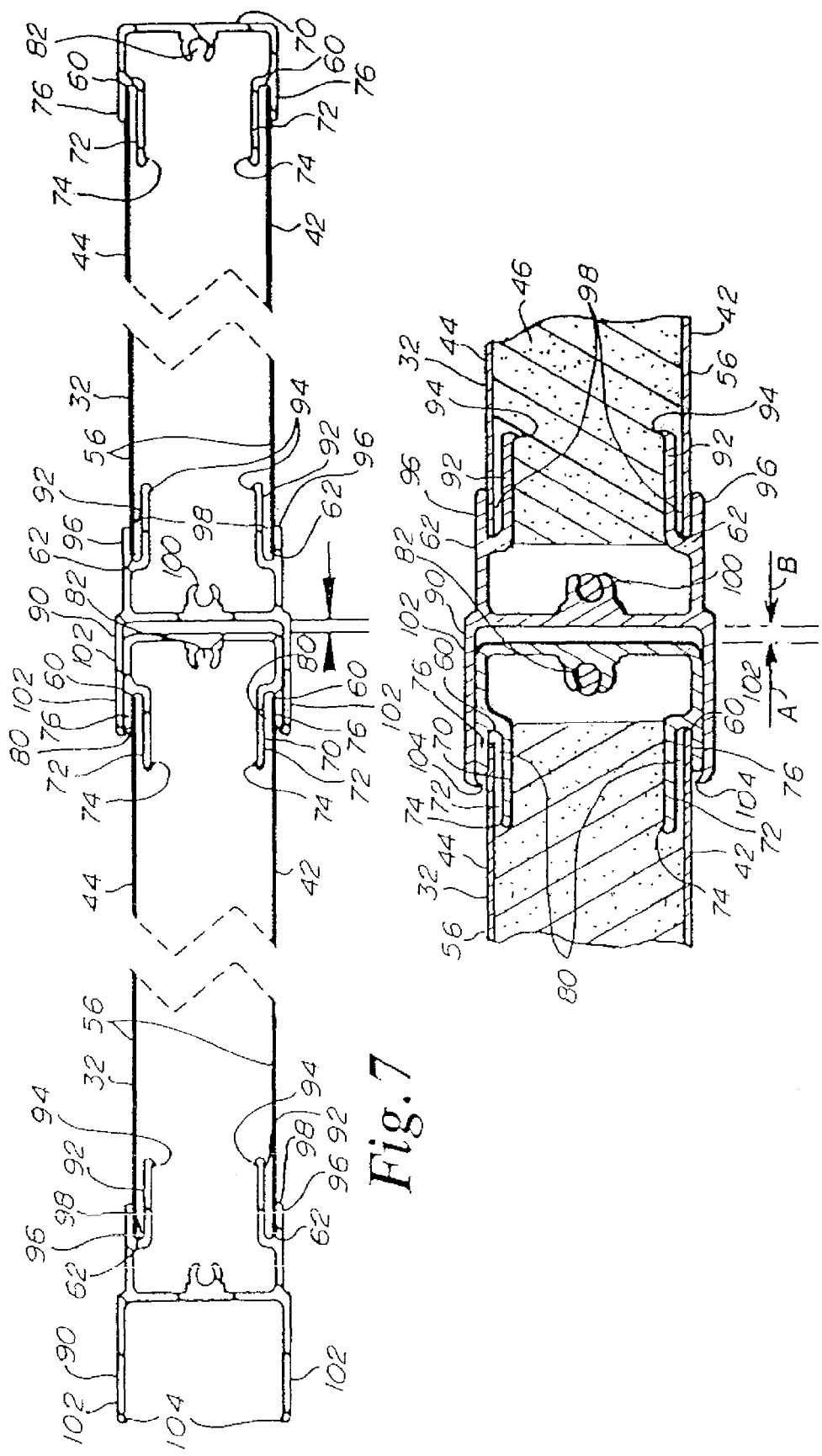

ADJOINING EXTRUSIONS FOR ANIMAL HUSBANDRY TUNNEL DOOR PANELS

BACKGROUND OF THE INVENTION

The present invention relates to chicken-raising barns or broiler houses, and more particularly, to an animal husbandry tunnel door with adjoining extrusions for closing tunnel ventilation openings typically in boiler houses.

The U.S. Poultry Industry has enjoyed a remarkable period of growth and expansion because health-conscious Americans are eating more chicken and because poultry meat is economical relative to competing food items.

Fifty years ago it took over twelve weeks to raise a four-pound broiler. Chickens or broilers have been selected for increased meat yield, better feed conversion and high growth rates for many decades. Through advances in genetic selection and nutrition, a five pound broiler can now be raised in six to seven weeks. Genetics and nutritional improvements in broiler production have been extremely important to the efficiency of poultry meat production; however, the full genetic potential of broilers cannot be reached unless the proper environment is maintained in the broiler house.

Broiler houses 10 shown in Prior Art FIG. 1 in the United States are constructed of wood or steel trusses and supports. The houses 10 are clear span structures from sidewall 14 to sidewall 14. The trusses are engineered to support the weight of the roof without the need of support posts that make it harder to catch birds and the clean out the house. The floor is typically compacted dirt that is covered with bedding material. House 10 dimensions are usually 40-50 feet wide, 400-600 feet long and with 8 foot high sidewalls 14. With increased broiler production, housing dimensions may also increase in the near future. Broiler houses utilize drop ceilings as they reduce the ceiling surface area and allows for the installation of ceiling insulation to reduce heat gain during hot weather and heat loss during cold weather. Modern broiler houses 10 are well insulated. Broiler houses 10 are constructed with access doors 12 and solid sidewalls 14 with tunnel openings or inlets 16.

The tunnel openings 16 might range in dimensions of 5 foot by 80 feet, depending upon the length of the house 10 or environment.

Early on, curtains 18 were mounted to close the tunnel openings 16 as they were connected to cabling 20 and an actuator or winch 22. During hot weather, the curtains 18 were open and during cold weather the curtains were closed. Ventilation is important because it delivers fresh air and removes excess heat, moisture and undesirable gases from the broiler house 10. Exhaust fans (not shown) are typically mounted in a broiler house 10 to assist the intake of fresh air into the housing. Cooling ventilation is particularly necessary for the chickens who produced body heat along with sun radiant heat and outside ambient high temperatures. Curtains 18 for tunnel openings 16 posed problems in cold weather in that they do not seal tight and stay sealed when the broiler house 10 is being exhausted. They also offer no or little insulation to keep the house warm during the cold or winter months.

Since early 2000, tunnel opening curtains 18 have generally been replaced with tunnel doors 31, as shown in Prior Art FIG. 2, along with evaporative coolers 26 having water saturated cellulous like pads 28. For this arrangement to work, tunnel door frames 30 were built around the tunnel openings where as the tunnel doors 31 at their lower edges would have hinges 34 to close the tunnel doors 31 over the tunnel opening 16 up against the tunnel door frames 30. Gaskets 36 were also used to improve the closed seal. Cables 38 were used to open and close the tunnel doors 31.

Problems with these tunnel doors 31 included their lack of insulation and proper alignment on the door frames to close the tunnel openings 16 and to work in unison with other tunnel doors suitably secured to each other. Often, the tunnel door 31 weight would force the door out of square creating large cracks and leaks for cold air to enter the broiler house during winter months. Hinge 34 durability was also a problem in that plastic hinges would split and breakdown over time. These prior art doors 31 needed to be pulled up tight to the door frame 30 to seal and were often held to adjacent tunnel doors by H channels with screws. These prior tunnel doors 31 extended along the sidewall 14 of the broiler house 10 for nearly 80 feet with a five foot height. Installation and proper alignment of the tunnel doors 31 were labor intensive and required many parts. "H" channels and screws were required to be properly aligned and secured. Older broiler houses posed problems with "squaring" everything up for a proper fit and seal.

Evaporative cooling systems 26 were found valuable during hot weather. Recirculating water would run through a perforated pipe at the top of the cool cell pads 28. Water runs down and through the pad 28 soaking it. Any water that is not evaporated is caught in a trough at the bottom of the pad that delivers the unused water back to the reservoir to be pumped through the system again. Depending on environmentally conditions (temperature and humidity), incoming air temperatures can be lowered by ten degrees Fahrenheit or more utilizing evaporative cooling systems 26.

There is a need for an animal husbandry tunnel door with lightweight, simple, economical adjoining extrusions for closing tunnel ventilation openings in broiler houses.

SUMMARY OF THE INVENTION

An animal husbandry tunnel door with adjoining extrusions for closing a tunnel ventilation opening typically in a broiler house has opposing faces with top, bottom and side edges. The faces sandwich an insulation layer. The adjoining extrusions have a first door top, bottom and side extrusion, along with a second door side edge extrusion. The first door top, bottom and side edge extrusions each have parallel inner prongs with barbs and adjacent parallel outer flanges forming two slots therebetween for receiving the top, bottom and side edges of the opposing door faces as the inner prongs with barbs pass into the insulation and are held thereat. The second door side edge extrusion has parallel inner prongs adjacent parallel outer flanges forming two slots therebetween for receiving the other side face edges as the inner prongs with barbs pass into the insulation and are held thereat. The second extrusion has second opposing parallel skirt flanges with inward distal barbs adapted to impinge upon, securely capture and hold the outer flanges of one of the first extrusions of a second adjacent tunnel door.

A principal object and advantage of the present invention is the ease in which two men can assemble and install the broiler house adjacent tunnel doors with adjoining extrusions without parts or screws into a broiler house.

Another object and advantage is a present invention is the economical cost of the extrusions and the cost and assembly of the tunnel doors.

Another object and advantage of the present invention is that the tunnel door extrusions exhibit good strength and rigidity to the assembled light-weight tunnel door arrangement.

Another object and advantage of the present invention is that there are fewer inventoried items and/or parts as with the prior art tunnel doors thereby making lost items or parts virtually nonexistent with the tunnel doors assembly of the present invention.

Another object and advantage of the present invention is that the tunnel doors and their extrusions reduce jobsite delays from component loss or damage as there are fewer parts to handle during a tunnel door wall installation.

Another object and advantage of the present invention is that the attached adjoining first and second extrusions form a secured gap therebetween without misalignments as they must completely seal the tunnel door openings when closed and still allow for expansion and contraction during hot and cold weather.

Another object and advantage of the present invention is that the tunnel door extrusions add great rigidity to the overall assembly thereby keeping the tunnel doors aligned with the tunnel openings to ensure a tight seal at the tunnel openings and that the seal remains tight during daily operation within the broiler house during cold weather.

Another object and advantage of the present invention is that the tunnel door extrusions of a first installed door will hold and support a second tunnel door in appropriate position during its hinging and installation to the tunnel door frame without the need of additional manpower or tacking.

BRIEF DESCRIPTION OF THE DRAWINGS

FIG. 1 is a Prior Art perspective view of a partially broken away animal husbandry barn or broiler house;

FIG. 2 is a Prior Art view of a cross section through a side wall of the broiler house 10 showing a Prior Art tunnel door and a recirculating evaporative cooler system;

FIG. 6 is a cross sectional view of the tunnel door and extrusion taken along line 6-6 of FIG. 4;

FIG. 7 is a top plan view of adjoining tunnel doors partially broken away without insulation for ease of understanding; and FIG. 8 is an enlarged cross sectional view of two tunnel doors with adjoining extrusions.

DETAILED SPECIFICATION

Figure 3:
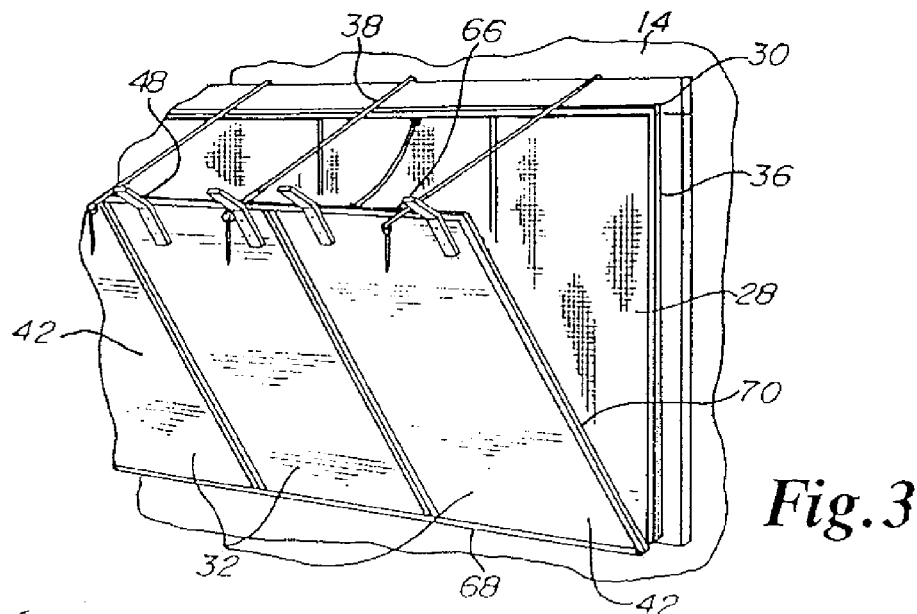
FIG. 3 is a perspective view from the inside of the broiler house of the tunnel door and extrusions of the present invention mounted on a side wall.
Figure 4:
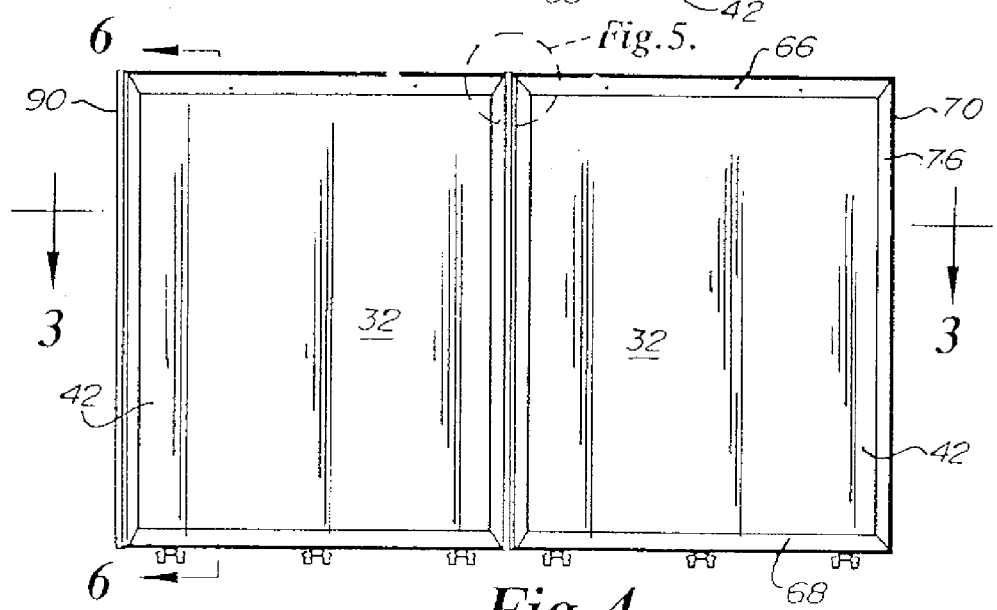
FIG. 4 is a front elevational view of two tunnel doors with adjoining extrusions of the present invention.
Figure 5:
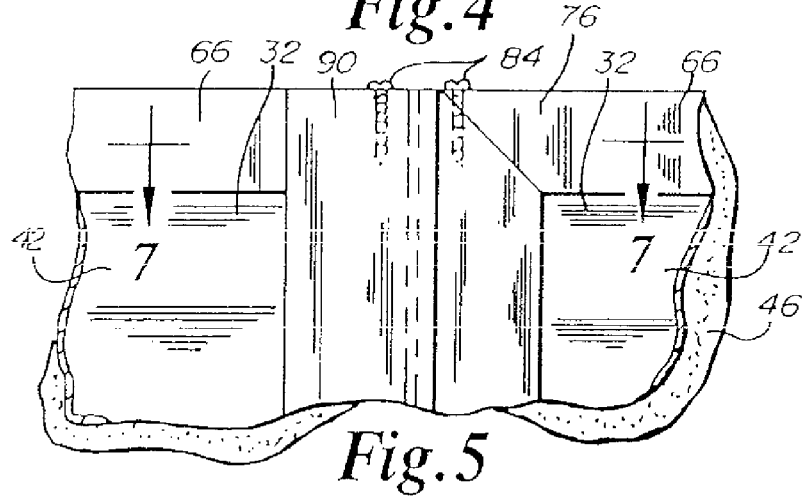
FIG. 5 is an enlarged broke away view of the area shown in dash circle marked FIG. 5 in FIG. 4.

The improved tunnel door 32 and first and second door edge extrusions 66, 68, 70 and 90, respectively, may be generally viewed in FIGS. 3-8.

Tunnel door 32 is comprised of plastic or aluminum skins or faces 42, 44 with a foam core 46 therebetween. The door has a door bracket 48 on its inner face 42 held in place by carriage bolts and nuts 50 with alternating eye bolts and nuts 52. The tunnel door 32 is mounted to the tunnel door frames 30 at the door's bottom by way of hinges 34. The tunnel door has top, bottom, right and left side edges 56, 58, 60 and 62 respectively.

The first door edge extrusions 66, 68 and 70 are for the top, bottom and right side edges 56, 58 and 60 of the tunnel doors 32. The first door extrusions 66, 68, 70 have elongate parallel inner prongs 72 with inwardly directed barbs 74 to pass through and grip the foam core 46. Parallel outer flanges 76, in combination with the inner prongs 72 form slots 80 therebetween which will receive the top, bottom and right side edges 56, 58 and 60 of aluminum faces 42, 44. The first door edge extrusion includes a screw retainer slot or groove 82 to receive and securely hole screws 84 and extrusions 66, 68 and 70 to tunnel doors 32.

The second door edge extrusion 90 has parallel inner prongs 92 with inwardly directed barbs 94. Parallel outer flanges 96 together with the inner prongs 92 form a slot 98 for receiving the tunnel door left edges 62 of aluminum faces 42, 44. The second extrusion 90 also has a screw retainer 100. Opposing parallel skirt flanges 102 have inwardly directed barbs 104 at their ends. The skirt flanges 102 are provided to slide over and securely capture the parallel outer flanges 76 of the top, bottom or right edge extrusions 66, 68 and 70 of an adjacent tunnel door 32. Suitably the skirt flanges 102 slide over and securely capture the parallel outer flanges 76 of the right edge extrusion 70 of adjacent tunnel door 32 to create an elongate assembly of tunnel doors 32 to close tunnel openings 16.

In manufacturing, the plastic or aluminum skin or faces 42 and 44 are formed sandwiching a foam core 46 suitably with a foam insulation 46 having a value of R5 to R7. The first door edge extrusion 66, 68 and 70 are measured to fit the tunnel door 32 with 45 degree mitered ends. The parallel inner prongs 72 are forced into the foam core 46 with the top and bottom mitered corners to be aligned for proper fitting. As the inner prongs 72 are forced inwardly, the slots 80 received and capture top, bottom and right side edges 56, 58 and 60 of aluminum faces 42 and 44.

Similarly, the second edge extrusion 90 has its ends mitered at 45 degrees for proper length and alignment with the tunnel door 32. The parallel inner prongs 92 are forced into the foam core 46 as slots 98 receives the left edges of 62 of the tunnel door 32 securing the extrusion there at. Thereafter, screws 84 may be driven into retainers 82 and 100 to secure the first and second extrusions 66, 68, 70 and 90 to the tunnel door 32. After this assembly, the tunnel doors are ready for delivery to the broiler house for installation after the tunnel door frame 30 is inspected for proper condition or a new tunnel door frame 30 is installed.

Installation of the tunnel doors 32 is simple and requires no more than two persons. Starting at one end of the frame opening, such as the right side, the tunnel door 32 is leveled and lag screws or bolts are mounted through the hinges 34 into the tunnel door frame 30. Tacking may assist with this step. A second tunnel door panel 32 is assembled to the first door panel 32 by aligning and snapping the left side edge 62 second door edge extrusion 90, particularly opposing parallel skirt flanges 102 over the parallel outer flanges 76 of the next tunnel door 32 as clearly shown in FIGS. 7 and 8. The height of the newly added second tunnel door 32 should be aligned to the first door panel tunnel opening 16 and may be adjusted by a rubber mallet. The hinges 34 of the second tunnel door are secured to the tunnel door frame 30 with lag bolts. This process is repeated until all tunnel door panels 32 are in place. Safety cables 39 may be installed to support the doors during assembly and further to assure that the assembled tunnel doors 32 do not fall onto the chickens or broilers should the cables 38 that open and close the doors 32 fail.

FIGS. 7 and 8 show arrows A and B to emphasize the expansion gap between first and second extrusions 70 and 90. By this arrangement, assembled and connected adjacent tunnel doors 32 are allowed to expand and contract due to hot and cold temperatures.

The present invention as disclosed herein is for illustrative purposes only with particular attention to the attached claims for definition of the invention.

What is claimed:

1. Animal husbandry tunnel doors with adjoining extrusions for closing tunnel ventilation openings typically in broiler houses, comprising:
   a. first and second adjacent tunnel doors, each with opposing faces with top, bottom and side edges, the faces sandwiching an insulation layer wherein the insulation layer is foam;
   b. first door top, bottom and side edge extrusions each having parallel rigid inner prongs each with a barb thereon and adjacent parallel outer flanges, the parallel inner prongs and outer flanges forming two slots therebetween for receiving the top, bottom and side edges of the opposing door faces of the first adjacent tunnel door and the edges of the top, bottom and one side of the second adjacent tunnel door as the inner prongs pass into the insulation and are held thereat; and
   c. second door side edge extrusion having parallel inner rigid prongs each with a barb thereon and adjacent parallel outer flanges, the parallel inner prongs and outer flanges forming two slots therebetween for receiving the other side edges of door faces of the second adjacent tunnel door as the inner prongs pass into the insulation and are held thereat, and second opposing parallel skirt flanges each with an inward distal barb, each flange flexibly adapted to impinge upon, slide over, securely capture and hold the outer flanges of one of the first extrusions of the first adjacent tunnel door.

2. The tunnel door of claim 1, wherein the first and second extrusions are made of aluminum.

3. Rectangular animal husbandry tunnel doors with adjoining extrusions for closing tunnel ventilation openings typically in broiler houses, comprising:
   a. first and second tunnel doors each with opposing faces with top, bottom and side edges, the faces sandwiching an insulation layer wherein the insulation layer is foam;
   b. first door top, bottom and side edge aluminum extrusions each having parallel rigid inner prongs each with a barb thereon and adjacent parallel outer flanges, the parallel inner prongs and outer flanges forming two slots therebetween for receiving the top, bottom and side edges of the opposing door faces of the first tunnel door as the inner prongs with barbs pass into the insulation and are held thereat; and
   c. second door side aluminum edge extrusion having parallel rigid inner prongs each with a barb thereon and adjacent parallel outer flanges forming two slots therebetween for receiving the other side edges of opposing door faces of the second adjacent tunnel door as the inner prongs with barbs pass into the insulation and are held thereat, and second opposing parallel skirt flanges each with an inward distal barb, each flange flexibly adapted to impinge upon, slide over, securely capture and hold the outer flanges of one of the first extrusions of the first adjacent tunnel door.

* * * * *